April 21, 1925.
H. WILLSHAW
1,534,149
BRACELET SPRING CLAMP FOR TUBE CORES AND METHOD OF MANUFACTURING TUBES
Filed April 2, 1924
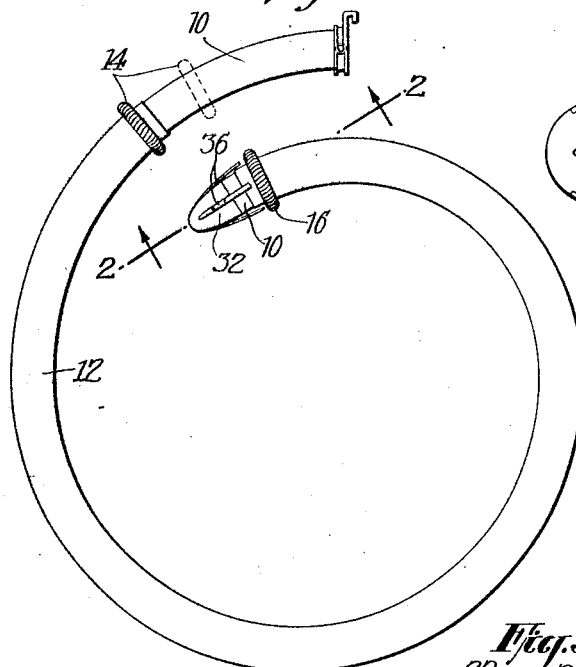
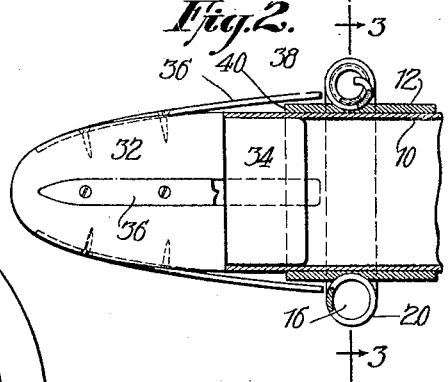
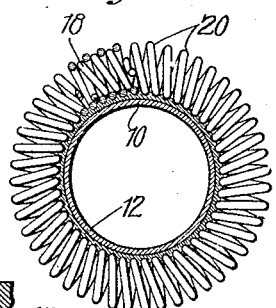
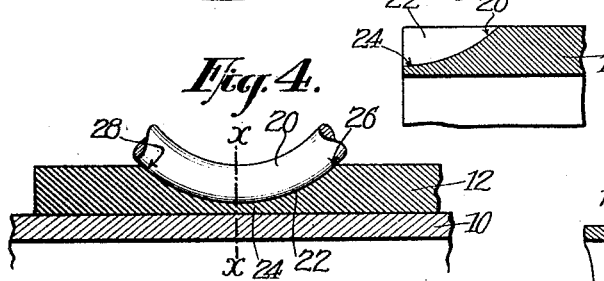
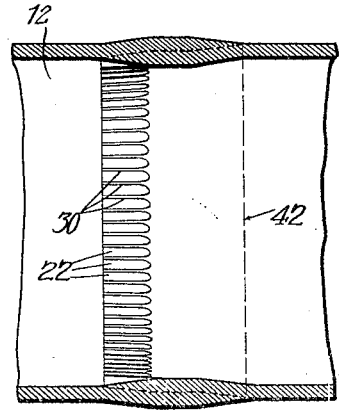
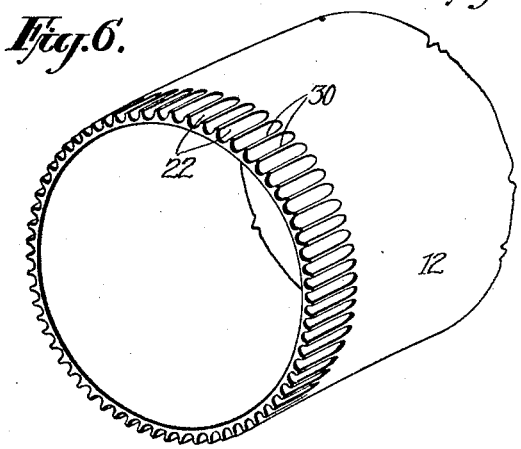
INVENTOR
HARRY WILLSHAW.
BY
ATTORNEY Patented Apr. 21, 1925.

1,534,149

UNITED STATES PATENT OFFICE.

HARRY WILLSHAW, OF BUFFALO, NEW YORK, ASSIGNOR TO DUNLOP TIRE AND RUBBER CORPORATION OF AMERICA, OF BUFFALO, NEW YORK, A CORPORATION OF NEW YORK.

BRACELET SPRING CLAMP FOR TUBE CORES AND METHOD OF MANUFACTURING TUBES.

Application filed April 2, 1924. Serial No. 703,614.

*To all whom it may concern:*

Be it known that I, HARRY WILLSHAW, a subject of the King of Great Britain, and a resident of Buffalo, in the county of Erie and State of New York, have invented certain new and useful Improvements in Bracelet Spring Clamps for Tube Cores and Methods of Manufacturing Tubes, of which the following is a specification.

This invention relates to devices used in the manufacture of tubes and to improvements in the method of manufacture thereof. While not limited thereto the invention is applicable to the manufacture of inner tubes such as used for vehicle tires. The invention aims to provide an improved method and means for skiving or beveling portions of tubes by the utilization of means for exerting a pressure on the tube wall whereby the latter is reduced in sectional area near each end so as to facilitate the production of a smooth joint where the ends of the tube are united to form a continuous circular tube.

The advantages of the invention will be apparent from the following specification when read in connection with the accompanying drawings in which—

Fig. 1 illustrates in plan a device embodying the features of the invention and a step in the method of manufacture;

Fig. 2 is an enlarged sectional view on line 2—2 of Fig. 1;

Fig. 3 is a transverse section on line 3—3 of Fig. 2;

Fig. 4 is an enlarged detail of a part shown in Fig. 2;

Fig. 5 is an enlarged section of a portion of the tube after an end has been trimmed therefrom;

Fig. 6 is a perspective view illustrating the end of a tube which has been skived or beveled according to my improved method by means of the improved bracelet clamp;

Fig. 7 is a fragmentary section showing the ends of the tube telescoped prior to uniting the same;

Fig. 8 is a longitudinal section through a joint where the skived ends of the tube have been united.

Referring in detail to the drawings, 10 represents a mandrel or core on which is placed an uncured rubber tube 12 which is to be subsequently vulcanized. In so far as the present invention is concerned, the tube may be engaged with the mandrel in any suitable manner. In passing it is noted, however, that the tube can be conveniently inserted on the mandrel by the use of air pressure which partly inflates the tube to overcome the friction between the walls thereof and the mandrel as disclosed in my co-pending application Serial No. 699,414, filed March 15, 1924.

To prevent the ingress of steam, air or water between the walls of the tube 12 and the mandrel 10 during the process of vulcanization, I preferably engage resilient bracelet clamps 14 and 16 over the ends of the tubes. These bracelets as best shown in Fig. 3 are formed of spiral spring stock the ends being joined as at 18 to form a continuous circular spring ring or bracelet. The diameter of the bracelet clamp is such that in order to place it on the mandrel 10 the convolutions 20 of the spring are tensioned. It is thus apparent that when the same is engaged with the tube wall it will exert a substantially uniform pressure on all portions thereof which it engages and thus hold the tube firmly in contact with the core 10. It is thus clear that these bracelet clamps will prevent the entrance of steam, air or water between the tube walls and the core when the tube is subjected to the vulcanizing process. In addition to this function the convolutions 20 of the bracelet clamps will exert sufficient pressure on the uncured rubber tube to form a series of depressions 22 in the tube wall. Because of the circular shape of the convolutions of the spring the depressions will taper as indicated in Fig. 4 from the point 24 to the points 26 and 28. The wall of the tube is thus skived or beveled by the spring pressure exerted by the bracelet clamp leaving fins 30 standing between the adjacent depressions.

The normal or natural diameter of each bracelet ring is smaller than the diameter of the core 10. To facilitate the engagement of the bracelet with the mandrel or core I provide a plug 32 having a shank 34 adapted to be inserted at the end of the core as shown in Fig. 2. This plug is tapered as shown and permits the spring bracelet to be rolled over the same and gradually expanded due to the increasing diameter of the plug. The plug is provided with a plurality of guide strips 36 the end 38 of which are flared sufficiently to overlap the end 40 of the tube 12 so that the bracelet can be easily rolled over this extreme end of the tube.

In the process of manufacture the tubes are vulcanized while on the cores 10 and with the bracelets 14 and 16 firmly engaging the ends thereof. After the vulcanizing step the bracelet 14 is rolled off the end of the tube onto the mandrel as indicated in dotted lines in Fig. 1 and the bracelet 16 and plug 32 are removed and the tube is stripped from the mandrel. The ends of the tube are then trimmed off, the cut at each end of the tube embraced by the bracelet being made in substantially the center of the skived portion as indicated by the dotted line x—x in Fig. 4 thus the tube has the appearance shown in Fig. 5 where it is noted that the wall is skived or beveled from the point 24 to point 26 the tube having a feather edge as shown in Fig. 6. When the tube is stripped from the mandrel it is usually, though not necessarily, turned inside out. This will bring the feather edge to the inner side of the tube as shown in Fig. 7. The skived ends of the tube are next telescoped within one another and cemented and vulcanized to form a smooth joint. This may be readily accomplished because of the fact that the ends of the tube have been skived or beveled off as above described it being apparent that the series of tapered depressions reduces the sectional area of the ends of the tube wall and permits a tapered joint to be made. By applying pressure and heat the feather edges between the tapered depressions can be entirely obliterated if desired to form a smooth joint. It is, however, quite unnecessary to remove these feather edges from the inside of the tube as they do not show and furthermore are unobjectionable not coming in contact with any other part. The feather edges on the overlapping portion 42 will be obliterated when the joint is vulcanized. The selvage end of the tube may be either trimmed off while the tube is on the mandrel or after the same has been stripped therefrom.

Though I have described with great particularity a specific construction of certain devices used and a certain sequence in the steps in the method, it is not to be construed that I am limited thereto as changes may be made by those skilled in the art without departing from the invention as defined in the appended claims.

What I claim is:—

1. In combination with a core used for the vulcanization of rubber tubes, a spiral spring bracelet adapted to be rolled into engagement with the end of a tube on said core.

2. In combination with a core used for the vulcanization of rubber tubes, a tension spring having its ends joined to form a bracelet adapted to embrace a tube on said core to prevent the ingress of steam, air or water between the tube and its supporting core.

3. In combination with a core used for the vulcanization of rubber tubes, a circular tension spring for beveling or skiving the tube on said core.

4. In combination with a core used for the vulcanization of rubber tubes, a circular tension spring bracelet adapted to be rolled over the end of an unvulcanized tube on said core to prevent the ingress of steam, air or water during vulcanization and to exert sufficient pressure on the tube stock to form a multiplicity of arcuate depressions therein.

5. In combination with a core used for the vulcanization of rubber tubes, a resilient bracelet adapted to engage the end of a tube on said core and means for gradually expanding said bracelet to facilitate its engagement with the tube thereon.

6. In combination with a core used for the vulcanization of rubber tubes, a spiral spring having its ends joined to form a bracelet adapted to exert a pressure on the tube supported on said core.

7. In combination with a core used for the vulcanization of rubber tubes, a spiral spring having its ends joined to form a bracelet adapted to exert a pressure on the tube supported on said core and means whereby the bracelet can be expanded and rolled into engagement with the end of the tube on said core.

8. A device for use in the manufacture of rubber tubes comprising a spiral spring having its ends joined to form a bracelet adapted to exert a pressure on an unvulcanized tube.

9. A device for use in the manufacture of rubber tubes comprising a spiral spring having its ends joined to form a bracelet for yieldingly embracing a tube supported on a core to form a series of depressions to facilitate the splicing of the ends of the tube.

10. The combination with a core on which a tube is adapted to be vulcanized, of a contractible member for pressing the tube stock firmly in contact with said core, said member being of such formation that a series of depressions are formed around the tube wall.

11. The combination with a tube core of a circular tension member for firmly pressing a section of the tube in contact with the core and means on the core for expanding said tension member as it is rolled thereon.

12. The combination with a tube core of a contractible member for firmly pressing a circular section of the tube in contact with the core, and a tapered plug having a portion engaging the core and means secured to said plug overlapping the end of the tube adapted to guide the contractible member over the end of a tube on said core.

13. In the manufacture of rubber tubes the method which includes placing an unvulcanized tube on a core and rolling a resilient bracelet over the end of the tube to bevel or skive the end of the tube.

14. In the manufacture of rubber tubes the method which includes placing an unvulcanized tube on a core and exerting a pressure on the tube in a substantially radial direction throughout the periphery of the cross-section of the tube near an end thereof so as to skive or bevel the tube.

15. In the manufacture of rubber tubes the method which includes placing an unvulcanized tube on a core, rolling resilient bracelets over the ends of the tube to skive the latter and to exclude the entrance of steam or other fluid between the core and tube during vulcanization, vulcanizing the tube, cutting the tube through the approximate center of the skived portion and uniting the ends of the tube substantially as described.

In witness whereof, I have hereunto signed my name.

HARRY WILLSHAW.